United States Patent
Taneda

(10) Patent No.: US 8,118,341 B2
(45) Date of Patent: Feb. 21, 2012

(54) REAR FLOOR STRUCTURE IN VEHICLE BODY REAR PART

(75) Inventor: Kodai Taneda, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 12/717,363

(22) Filed: Mar. 4, 2010

(65) Prior Publication Data

US 2010/0225135 A1 Sep. 9, 2010

(30) Foreign Application Priority Data

Mar. 5, 2009 (JP) ................................. 2009-051753

(51) Int. Cl.
*B62D 25/20* (2006.01)
*B60R 11/06* (2006.01)
*B60R 27/00* (2006.01)

(52) U.S. Cl. ............... 296/37.2; 296/187.11; 296/187.08

(58) Field of Classification Search ............... 224/42.12; 296/37.14, 37.2, 37.3, 187.08, 187.11
See application file for complete search history.

(56) References Cited

U.S. PATENT DOCUMENTS

| | | | | |
|---|---|---|---|---|
| 3,595,335 | A | * | 7/1971 | Wessells et al. .......... 296/187.09 |
| 3,747,814 | A | * | 7/1973 | Briery ......................... 224/42.12 |
| 4,711,382 | A | * | 12/1987 | Helterbrand ............... 224/42.23 |
| 5,076,629 | A | * | 12/1991 | Peters et al. ................. 296/37.2 |
| 6,231,097 | B1 | * | 5/2001 | Schell et al. ................. 296/37.2 |
| 2009/0195030 | A1 | * | 8/2009 | Yamaguchi et al. ...... 296/193.08 |

FOREIGN PATENT DOCUMENTS

JP 62-102783 U 6/1987

* cited by examiner

*Primary Examiner* — Dennis Pedder
*Assistant Examiner* — Jason S Daniels
(74) *Attorney, Agent, or Firm* — Lerner, David, Littenberg, Krumholz & Mentlik, LLP

(57) ABSTRACT

A rear floor structure in a vehicle body rear part has a spare tire placing panel having an inclined surface inclined downward toward the vehicle front provided above a rear floor, and a spare tire tiltingly mounted on the spare tire placing panel. In the rear floor structure, in an intermediate portion in the front and rear direction of the spare tire placing panel, a convex part directed upward is provided so as to extend along the vehicle width direction; between the rear floor and the spare tire placing panel in the vertical direction, a space for disposing a jack, being a rigid member, is formed; and on the vehicle front side of the axis center of the jack on the rear floor, a projecting part extending in the vehicle width direction is provided.

14 Claims, 4 Drawing Sheets

REAR FLOOR STRUCTURE IN VEHICLE BODY REAR PART

CROSS-REFERENCE TO RELATED APPLICATIONS

This application claims the benefit of the filing date of Japanese Patent Application No. 2009-051753 filed Mar. 5, 2009, the entire disclosure of which is hereby incorporated herein by reference.

FIELD OF THE INVENTION

The present invention relates to a rear floor structure in the vehicle body rear part of an automobile.

BACKGROUND OF THE INVENTION

In the vehicle body rear part of an automobile, a storage part for storing a horizontally disposed spare tire is provided. For example, in the spare tire storage structure disclosed in Patent Document 1 (JP 62-102783 U), as shown in FIG. 6, an inclined surface 52 is formed in the rear part of a rear floor 51, and a spare tire 53 is stored in such a manner that a rear part 53a thereof is placed on the inclined surface 52. A front part 53b of the spare tire 53 is fixed by pressing a fixture 54, which is attached to the rear floor 51, from above.

In such a spare tire storage structure, when an impact load is applied from the vehicle rear, the rear part 53a of the spare tire 53 is pushed up along the inclined surface 52 inclined downward toward the vehicle front, and is turned counterclockwise toward the vehicle front. Thereby, the spare tire 53 is prevented from being pushed out in the horizontal direction toward the vehicle front.

Unfortunately, for the above-described conventional storage structure, since the inclined surface 52 on which the rear part 53a of the spare tire 53 is placed is formed on the rear floor 51, it is difficult to make adjustments so as to prevent the spare tire 53 from being displaced to the vehicle front when an impact load is applied from the vehicle rear. That is to say, the conventional storage structure has a problem in that if the angle of inclination of the inclined surface 52 is increased to ensure the turning action of the rear part 53a of the spare tire 53, the floor height of a cargo compartment in the vehicle body rear part increases, so that a space between the spare tire 53 and the rear floor 51, which can be used as a storage space, cannot be utilized, and the cargo compartment becomes difficult to use.

On the other hand, if the angle of inclination of the inclined surface 52 is small, when an impact load is applied from the vehicle rear, the spare tire 53 is not turned counterclockwise by the pushing-up action of the rear part 53a, and moves to the vehicle front, so that the load may be applied to a member present on the front side of the spare tire 53.

SUMMARY OF THE INVENTION

The present invention has been made in view of the above circumstances, and accordingly, an object thereof is to provide a rear floor structure in a vehicle body rear part, in which even if the angle of inclination of a panel for placing a spare tire is small, when an impact load is applied from the vehicle rear, the rear part of the spare tire is pushed up enough to turn the spare tire to the vehicle front, whereby the displacement of the spare tire to the vehicle front is restrained, and the decrease in breakage of the vehicle body rear part and the security of storage space can be achieved.

To solve the problems with the conventional art, the present invention provides a rear floor structure in a vehicle body rear part, in which a spare tire placing panel having an inclined surface inclined downward toward the vehicle front is provided above a rear floor, and a spare tire is tiltingly mounted on the spare tire placing panel, wherein in an intermediate portion in the front and rear direction of the spare tire placing panel, a convex part directed upward is provided so as to extend along the vehicle width direction; between the rear floor and the spare tire placing panel in the vertical direction, a space for disposing a rigid member is formed; and on the vehicle front side of the axis center of the rigid member on the rear floor, a projecting part extending in the vehicle width direction is provided.

Also, in the present invention, the spare tire placing panel is provided with a bead, which extends in the vehicle longitudinal direction, excluding the convex part.

Furthermore, in the present invention, the rigid member is a jack.

In the present invention, a back panel is provided in the rear part of the rear floor, and the rear part of the spare tire placing panel is joined to the back panel so that the spare tire is positioned at the installation height of a bumper member.

Also, in the present invention, the back panel under a joint part of the back panel and the spare tire placing panel is provided with a bead part extending in the vehicle width direction, and the rear floor and the back panel are joined to each other in the bead part.

Furthermore, in the present invention, above the rear floor, a spare tire bracket having a spare tire fixture is provided; the rear part of the spare tire bracket is joined to the front part of the spare tire placing panel; and the projecting part of the rear floor is provided between the joint part of the spare tire bracket and the spare tire placing panel and the joint part of the back panel and the spare tire placing panel.

Also, in the present invention, the back panel is formed into a curved shape projecting toward the vehicle rear, and the spare tire placing panel is formed so that the size in the vehicle width direction thereof increases toward the vehicle rear.

As described above, the rear floor structure in a vehicle body rear part is configured so that the spare tire placing panel having an inclined surface inclined downward toward the vehicle front is provided above a rear floor, and the spare tire is tiltingly mounted on the spare tire placing panel. In an intermediate portion in the front and rear direction of the spare tire placing panel, the convex part directed upward is provided so as to extend along the vehicle width direction; between the rear floor and the spare tire placing panel in the vertical direction, the space for disposing the rigid member is formed; and on the vehicle front side of the axis center of the rigid member on the rear floor, the projecting part extending in the vehicle width direction is provided. Therefore, when an impact load is applied to the vehicle body rear part from the vehicle rear, the rear floor is bent upward to push the rigid member up. Therefore, the upward bending of the spare tire placing panel in the convex part is promoted by the pushed-up rigid member, so that a great effect of pushing up the spare tire can be achieved.

Thereupon, according to the rear floor structure in accordance with the present invention, when an impact load is applied to the vehicle body rear part from the vehicle rear, the rear part of the spare tire can be pushed up sufficiently via the spare tire placing panel and turned to the vehicle front, so that the displacement of the spare tire to the vehicle front can be restrained reliably. Moreover, breakage of the vehicle body rear part can be reduced, and a usable storage space can be secured sufficiently, which provides superior convenience.

Also, in the present invention, the spare tire placing panel is provided with the bead, which extends in the vehicle longitudinal direction, excluding the convex part. Therefore, deformation caused by vibrations of the spare tire at the time of normal running can be restrained, and rigidity necessary for directly pushing up the spare tire can be secured sufficiently without hindrance to upward bending.

Furthermore, in the present invention, the rigid member is a jack. Therefore, the jack can be stored in such a manner as to be in close contact with the spare tire placing panel and the rear floor, the upward bending deformation of the rear floor can surely be transmitted to the spare tire placing panel, and the effect of jumping up of the rear part of the spare tire can be enhanced more.

Also, in the present invention, the back panel is provided in the rear part of the rear floor, and the rear part of the spare tire placing panel is joined to the back panel so that the spare tire is positioned at the installation height of the bumper member. Therefore, an impact load applied to the bumper member from the vehicle rear can be transmitted to the rear floor and the spare tire placing panel via the back panel.

Moreover, in the present invention, the back panel under the joint part of the back panel and the spare tire placing panel is provided with the bead part extending in the vehicle width direction, and the rear floor and the back panel are joined to each other in the bead part. Therefore, at the time of impact from the vehicle rear, the back panel provided with rigidity by the bead part presses the rear floor indirectly to the vehicle front and can promote the upward bending.

Furthermore, in the present invention, above the rear floor, the spare tire bracket having the spare tire fixture is provided; the rear part of the spare tire bracket is joined to the front part of the spare tire placing panel; and the projecting part of the rear floor is provided between the joint part of the spare tire bracket and the spare tire placing panel and the joint part of the back panel and the spare tire placing panel. Therefore, at the time of impact from the vehicle rear, the rear part of the spare tire bracket is pushed up reliably via the rear floor, the spare tire bracket, and the spare tire placing panel.

Moreover, in the case in which the joint of the back panel and the spare tire placing panel and the joint of the spare tire bracket and the spare tire placing panel are accomplished by bolt fastening, at the time of manufacturing, the welding work for welding the back panel to the rear floor and the sealer applying work can be performed easily.

Also, in the present invention, the back panel is formed into a curved shape projecting toward the vehicle rear, and the spare tire placing panel is formed so that the size in the vehicle width direction thereof increases toward the vehicle rear. Therefore, even when an offset or slantwise impact load is applied to the vehicle body rear part from the vehicle rear, the effect of jumping up the rear part of the spare tire can be achieved. Moreover, according to the present invention, in the specification in which a large-size tire is mounted, a common rear floor can be used.

DETAILED DESCRIPTION OF THE PREFERRED EMBODIMENTS

Figure 1:
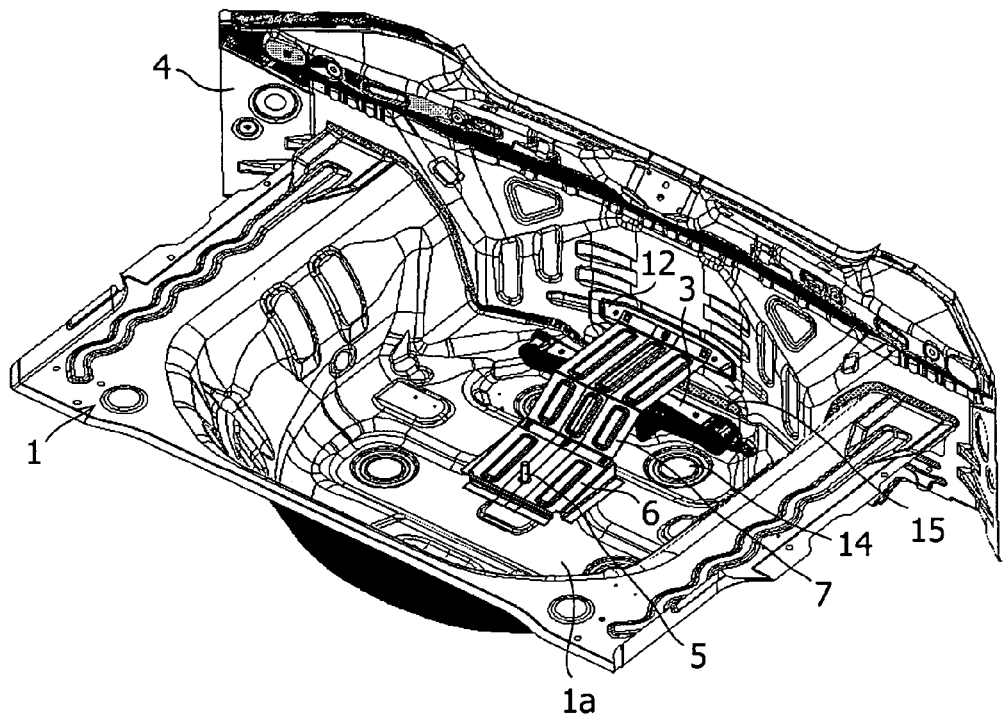
FIG. 1 is a perspective view of a rear floor structure in a vehicle rear part in accordance with an embodiment of the present invention.

The present invention will now be described in detail based on embodiments shown in the drawings.

FIGS. 1 to 4 show a rear floor structure in a vehicle body rear part in accordance with an embodiment of the present invention.

As shown in FIGS. 1 to 4, on a rear floor 1 in the vehicle body rear part of an automobile in accordance with the embodiment of the present invention, a concave-shaped tire storage part 1a depressed downward is formed, and in this tire storage part 1a, a horizontally disposed spare tire 2, a jack 3, which is a rigid member, and the like are stored. In the rear end part of the rear floor 1, a back panel 4 extending along with the vehicle width direction is erectingly provided.

Above the bottom surface of the tire storage part 1a, a spare tire bracket 6 having a spare tire fixture 5 for tightening the spare tire 2 by being inserted through the hole in the spare tire 2 and a spare tire placing panel 7 on which the rear part of the spare tire 2 is placed are disposed along the vehicle longitudinal direction.

The spare tire bracket 6 is formed by using one plate-shaped body, and has flange parts 6a and 6b. The vehicle front side and both of the right and left sides in the vehicle width direction, excluding the vehicle rear side, of the flange parts 6a and 6b are bent downward and the lower end thereof is bent at right angles to the outside. The flange parts 6b on both right and left sides are gradually bent more greatly toward the vehicle rear.

Therefore, by placing the flange parts 6a and 6b at predetermined positions on the bottom surface of the tire storage part 1a and welding them, the spare tire bracket 6 is fixedly disposed in the tire storage part 1a in an inclined state of being separated from the bottom surface of the tire storage part 1a toward the vehicle rear and being raised gradually.

Figure 2:
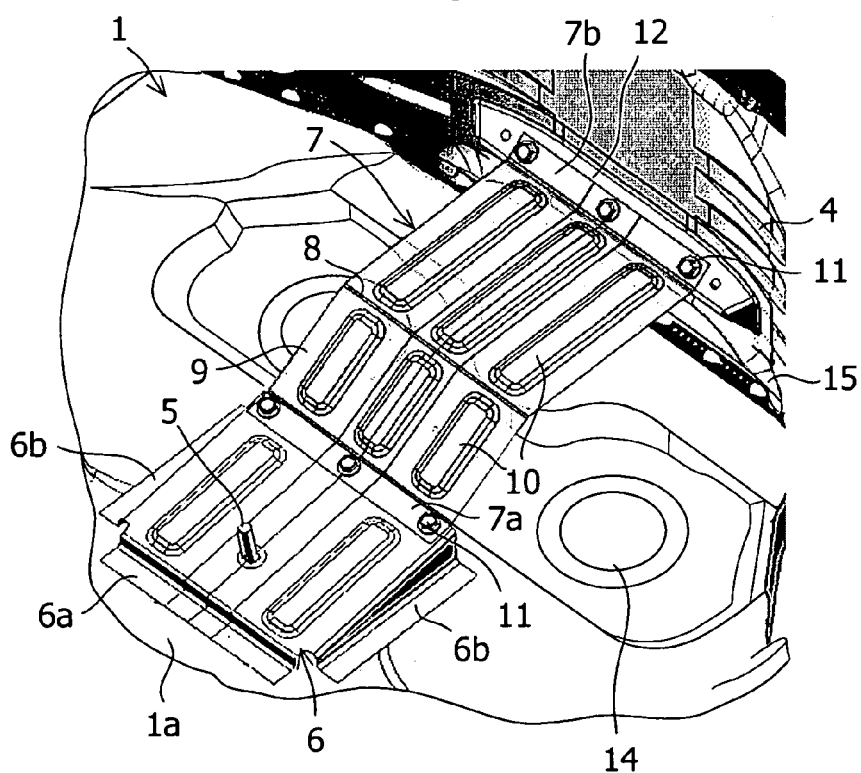
FIG. 2 is an enlarged perspective view of an essential portion of the rear floor structure shown in FIG. 1.

On the other hand, as shown in FIGS. 1 and 2, the spare tire placing panel 7 is formed by using one panel having a length such that the panel can be set approximately between the back panel 4 and the spare tire bracket 6. In an intermediate portion in the front and rear direction of the spare tire placing panel 7, a convex part 8 directed upward by being bent upward is provided so as to extend along the vehicle width direction. The spare tire placing panel 7 is configured so as to be bent upward in the convex part 8 when an impact load is applied from the vehicle rear. Moreover, the spare tire placing panel 7 has an inclined surface 9 inclined downward toward the vehicle front. Due to the presence of this inclined surface 9, the rear part of the spare tire 2 is placed on the spare tire placing panel 7. Therefore, the spare tire 2 is tiltingly disposed in a state of being tilted to the front. The inclined surface 9 is formed on the vehicle front side of the installation portion of the convex part 8.

The spare tire placing panel 7 is provided with a plurality of beads 10 extending in the vehicle longitudinal direction excluding the installation portion of the convex part 8. Due to the reinforcing effect of these beads 10, without hindrance to the upward bending in the convex part 8, deformation caused by vibrations of the spare tire 2 at the time of normal running is restrained and rigidity necessary for directly pushing up the spare tire 2 is secured. Therefore, the beads 10 are provided at intervals in the vehicle width direction at places in front and rear of the convex part 8 including the inclined surface 9.

A front part 7a of the spare tire placing panel 7 is placed on the rear part of the spare tire bracket 6, and is joined to the spare tire bracket 6 by tightening a plurality of bolts 11. Also a rear part 7b of the spare tire placing panel 7 is attached to the vehicle front side of the back panel 4 via a support bracket 12. This support bracket 12 is disposed extending in the vehicle width direction so that the front surface part is formed so as to be bent into a substantially chevron shape in cross section projecting to the vehicle front, and the rear surface part is fixed at a predetermined position on the front surface of the back panel 4. Therefore, the rear part 7b of the spare tire placing panel 7 is placed on the upper-side front surface part of the support bracket 12, and is joined to the support bracket 12 by tightening a plurality of bolts 11. Moreover, the rear part 7b of the spare tire placing panel 7 is joined to the support bracket 12 so that the spare tire 2 is positioned at the installation height of a bumper member 13 provided on the vehicle rear side of the back panel 4.

Between the bottom surface of the tire storage part 1a of the rear floor 1 and the spare tire placing panel 7 in the vertical direction, a space S for disposing the jack 3 is formed. In this space S, the stored jack 3 is brought into contact with the bottom surface of the tire storage part 1a and the spare tire placing panel 7, whereby the jack 3 is disposed so as not to move vertically, longitudinally, and transversely during running.

In a portion on the vehicle front side of the axis center of the jack 3 in the tire storage part 1a of the rear floor 1, a projecting part 14 for enhancing the torsional rigidity is provided so as to extend in the vehicle width direction. Moreover, the projecting part 14 is provided between the joint part of the rear part of the spare tire bracket 6 and the front part 7a of the spare tire placing panel 7 and the joint part of the support bracket 12 of the back panel 4 and the rear part 7b of the spare tire placing panel 7. When an impact load is applied from the vehicle rear, the side portion of the projecting part 14 provided at such a place induces buckling and upward bending of the tire storage part 1a of the rear floor 1, and assists the action such that a rear part 2a of the spare tire 2 jumps up via the rear floor 1, the jack 3, the spare tire bracket 6, and the spare tire placing panel 7.

On the back panel 4 under the joint part of the spare tire placing panel 7 and the support bracket 12, a bead part 15 extending in the vehicle width direction is provided. In this bead part 15, the rear floor 1 and the back panel 4 are joined to each other. The back panel 4 having rigidity increased by the bead part 15 has a function of pressing the rear floor 1 to the vehicle front and promoting bending of the rear floor 1 when an impact load is applied from vehicle rear.

Figure 3:
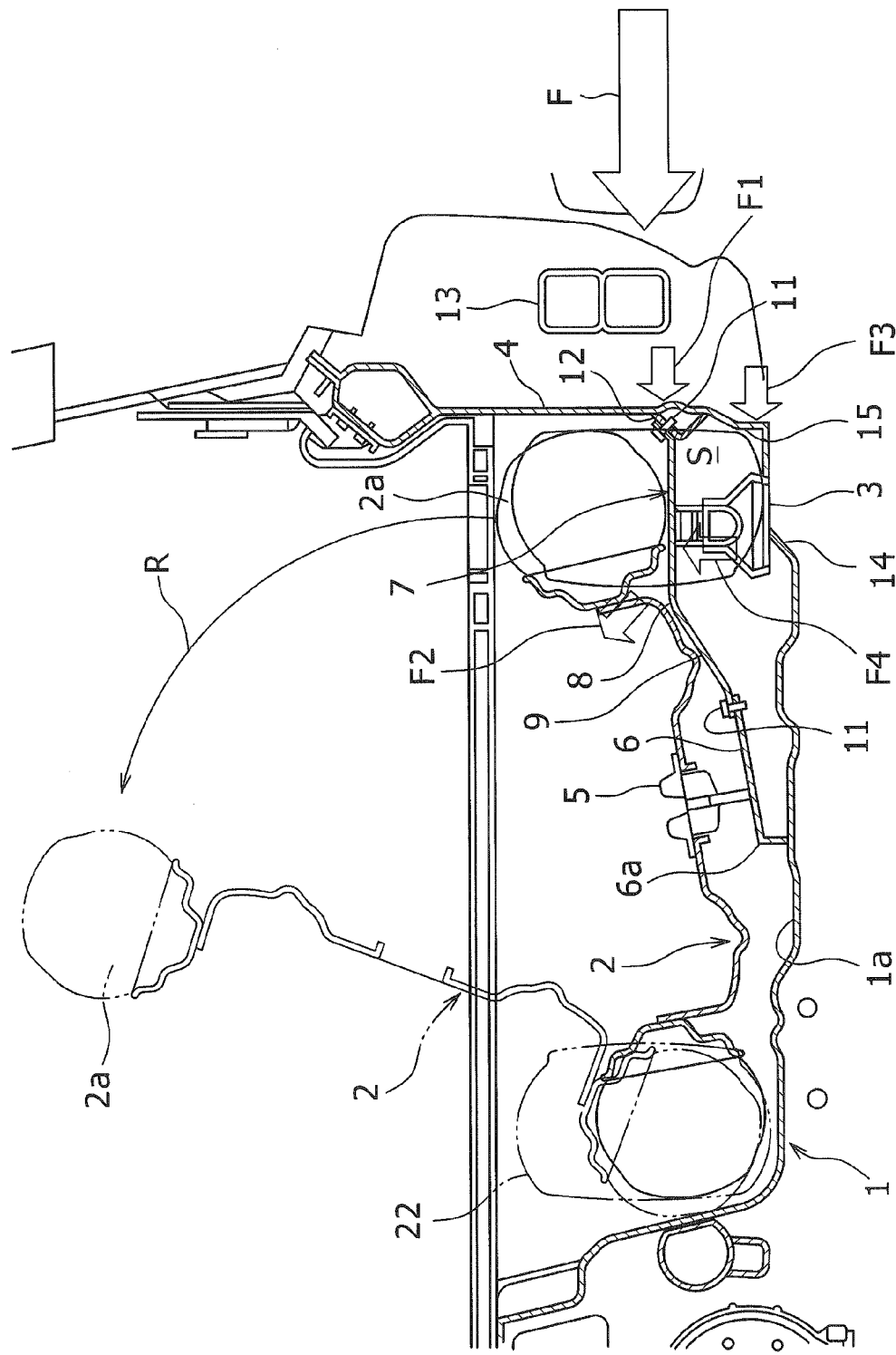
FIG. 3 is a sectional view showing a rear floor, a spare tire placing panel, and surrounding parts in a state in which an impact load is applied from the vehicle rear in a vehicle body rear part to which a rear floor structure of an embodiment of the present invention is applied.

On the automobile to which the rear floor structure in a vehicle body rear part in accordance with the present invention is applied, when an impact load F is applied to the vehicle body rear part from the vehicle rear toward the vehicle front as shown in FIG. 3, the impact load F is transmitted to the back panel 4 via the bumper member 13. Then, the impact load F presses the back panel 4 and the support bracket 12 to the vehicle front as indicated by an arrow mark F1, and presses the convex part 8 of the spare tire placing panel 7 upward slantwise to the vehicle front as indicated by an arrow mark F2. Also, the impact load F presses the rear floor 1 to the vehicle front via the bead part 15 of the back panel 4 as indicated by an arrow mark F3, and presses the jack 3 upward as indicated by an arrow mark F4.

Figure 4:
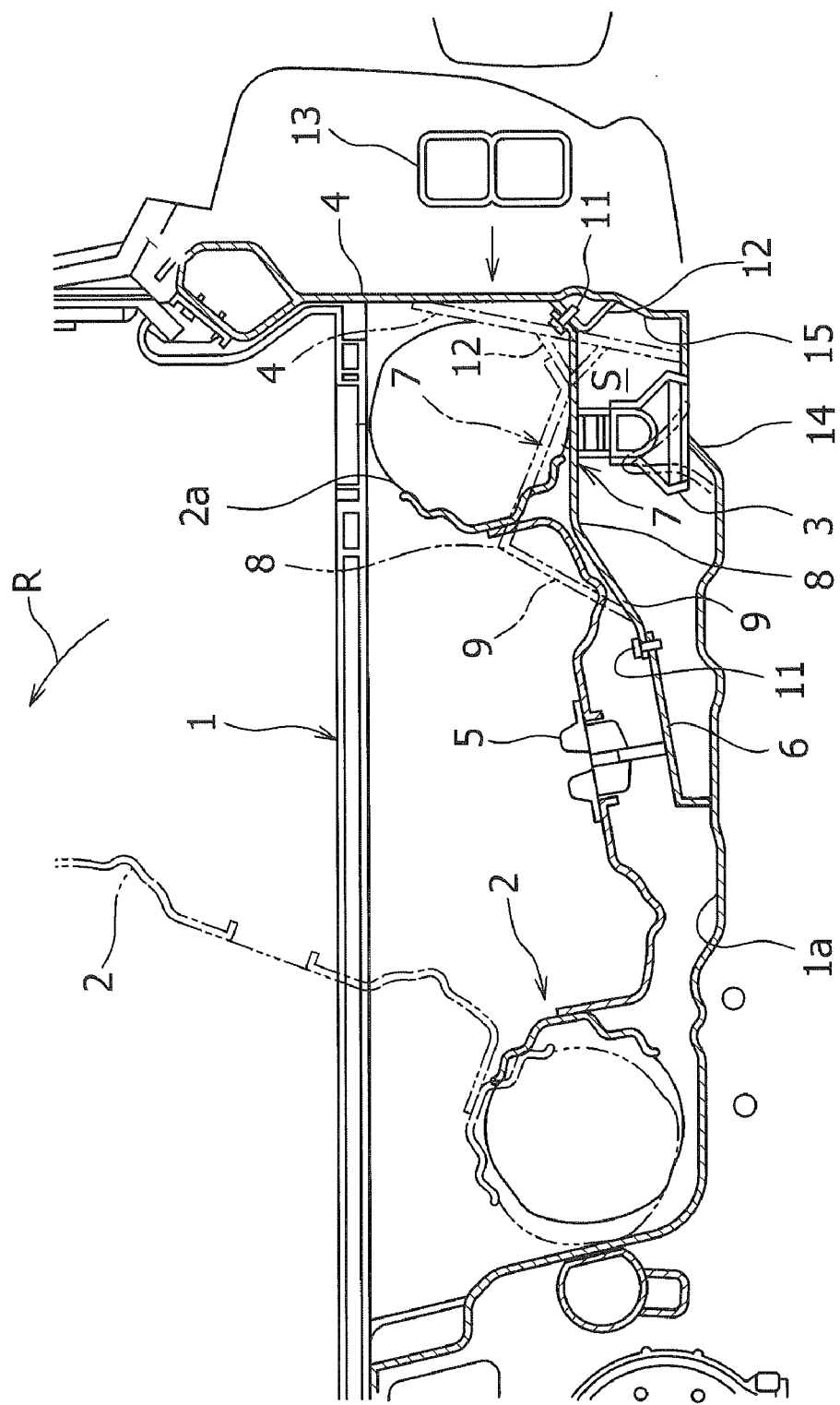
FIG. 4 is a sectional view showing a state in which the rear part of a spare tire is pushed up to the vehicle front by an impact load applied from the vehicle rear in FIG. 3.

Accordingly, as shown in FIG. 4, the spare tire placing panel 7 is bent upward in the convex part 8, and furthermore the rear floor 1 is bent upward in the side portion of the projecting part 14. As a result, the spare tire placing panel 7 is pushed up via the jack 3, which promotes the bending of the convex part 8. Therefore, the rear part 2a of the spare tire 2, which is tiltingly disposed on the spare tire placing panel 7, is caused to jump up as indicated by an arrow mark R, and is turned toward the vehicle front (refer to chain lines in FIGS. 3 and 4).

Thus, in the rear floor structure in a vehicle body rear part in accordance with the present invention, the inclined surface 9 is provided to tiltingly dispose the rear part 2a of the spare tire 2, the spare tire placing panel 7 formed with the convex part 8 extending in the vehicle width direction in the intermediate portion in the front and rear direction thereof is provided above the bottom surface of the tire storage part 1a of the rear floor 1, the jack 3 is disposed in the space S between the spare tire placing panel 7 and the bottom surface of the tire storage part 1a, and the projecting part 14 extending in the vehicle width direction is provided on the vehicle front side of the axis center of the jack 3. Therefore, when the impact load F is applied to the vehicle rear part from the vehicle rear toward the vehicle front, the spare tire placing panel 7 is bent upward in the convex part 8, and furthermore the rear floor 1 is bent upward in the side portion of the projecting part 14. As a result, the spare tire placing panel 7 is pushed up via the jack 3, and the convex part 8 is further bent upward. Therefore, the rear part 2a of the spare tire 2 is caused to jump up as indicated by the arrow mark R. Thereby, the action such that the spare tire 2 is turned toward the vehicle front can be secured, and the spare tire 2 can be restrained from being displaced horizontally toward the vehicle front by a simple structure without reduction in storage space.

Also, in the rear floor structure of this embodiment, the bolts 11 are used to join the front and rear parts 7a and 7b of the spare tire placing panel 7 to the spare tire bracket 6 and the support bracket 12 on the back panel side, respectively. Therefore, at the time of manufacturing, the spare tire placing panel 7 can be installed after the welding work for welding the back panel 4 to the rear floor 1 and the sealer applying work have been finished, so that the workability can be improved.

Figure 5:
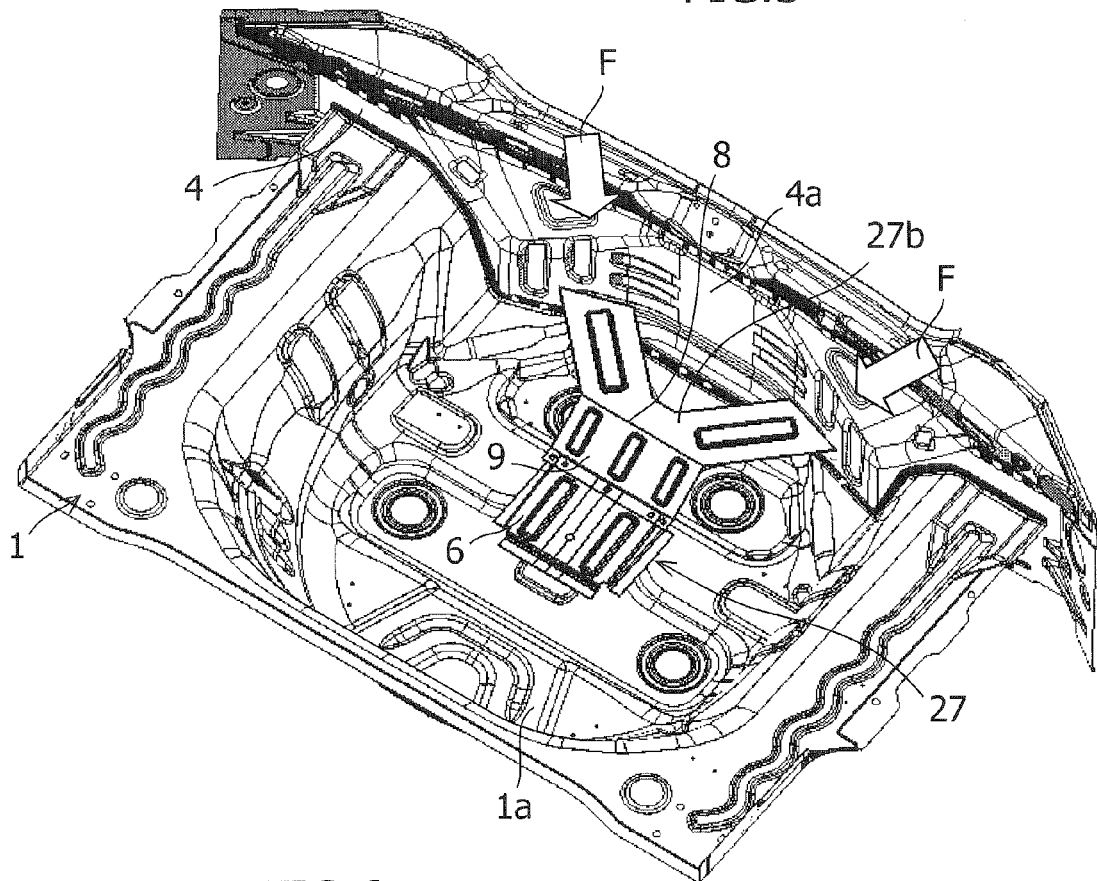
FIG. 5 is a perspective view of a rear floor structure in a vehicle rear part in accordance with another embodiment of the present invention.
Figure 6:
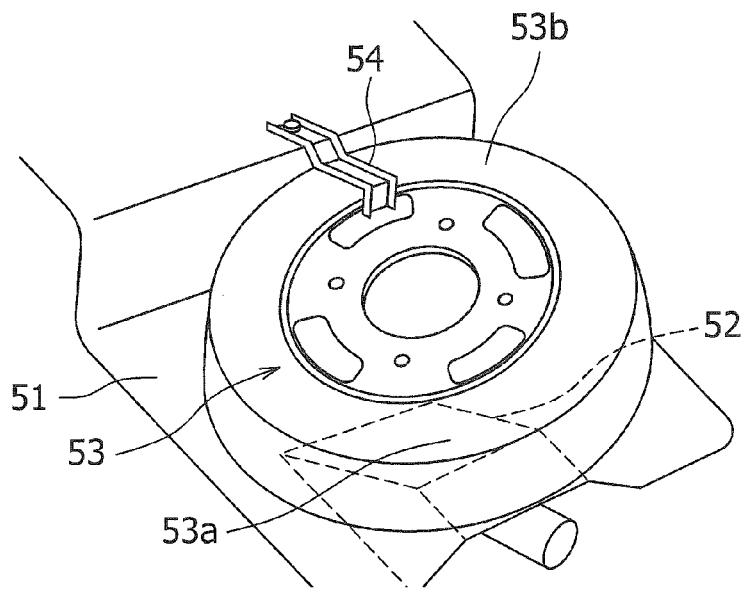
FIG. 6 is a perspective view showing a state in which a spare tire is stored by a conventional storage structure.

FIG. 5 shows a rear floor structure in a vehicle rear part in accordance with another embodiment of the present invention.

In this embodiment, unlike the above-described embodiment, a middle part 4a in the vehicle width direction of the back panel 4 is formed into a curved shape projecting toward the vehicle rear, and a rear part 27b of a spare tire placing panel 27 is forked into two branches and is formed so that the space in the vehicle width direction thereof is wider toward the vehicle rear.

Other configurations are the same as those of the above-described embodiment, and the same symbols are applied to similar elements as those in the above-described embodiment.

In the rear floor structure in a vehicle rear part in accordance with the latter embodiment of the present invention, since the middle part 4a in the vehicle width direction of the back panel 4 is formed into a curved shape projecting toward the vehicle rear, even in the specification in which a large-size tire 22 is mounted, the tire 22 can be stored in the tire storage part 1a of the rear floor 1. Moreover, since the rear part 27b of the spare tire placing panel 27 is forked into two branches and is formed so that the space in the vehicle width direction thereof is wider toward the vehicle rear, even when an offset or slantwise impact load F is applied to the vehicle body rear part from the vehicle rear toward the vehicle front, the impact load can be handled in the same way as described above;

specifically, the rear part 2a of the spare tire 2 tiltingly disposed on the spare tire placing panel 7 can be caused to jump up toward the vehicle front.

Other operations and effects are the same as those of the former embodiment.

The above is a description of the embodiments of the present invention. The present invention is not limited to these embodiments, and various modifications and changes can be made based on the technical concept of the present invention.

For example, in the latter embodiment of the present invention, the rear part 27b of the spare tire placing panel 27 is forked into two branches. However, the rear part 27b of the spare tire placing panel 27 may be formed into an integral fan shape, the size in the vehicle width direction of which increases toward the vehicle rear, or may be forked into three or more branches.

What is claimed is:

1. A rear floor structure in a vehicle body rear part, comprising:
    a spare tire placing panel having an inclined surface inclined downward toward the vehicle front provided above a rear floor, and a spare tire tiltingly mounted on the spare tire placing panel,
    wherein in an intermediate portion in the front and rear direction of the spare tire placing panel, a convex part directed upward is provided so as to extend along the vehicle width direction; between the rear floor and the spare tire placing panel in the vertical direction, a space for disposing a rigid member is formed; and on the vehicle front side of the axis center of the rigid member on the rear floor, a projecting part extending in the vehicle width direction is provided,
    wherein the rigid member is a jack.

2. The rear floor structure in a vehicle body rear part according to claim 1, wherein the spare tire placing panel is provided with a bead, which extends in the vehicle longitudinal direction, excluding the convex part.

3. The rear floor structure in a vehicle body rear part according to claim 1, wherein a back panel is provided in the rear part of the rear floor, and the rear part of the spare tire placing panel is joined to the back panel so that the spare tire is positioned at the installation height of a bumper member.

4. The rear floor structure in a vehicle body rear part according to claim 3, wherein the back panel under a joint part of the back panel and the spare tire placing panel is provided with a bead part extending in the vehicle width direction, and the rear floor and the back panel are joined to each other in the bead part.

5. The rear floor structure in a vehicle body rear part according to claim 3, wherein above the rear floor, a spare tire bracket having a spare tire fixture is provided; the rear part of the spare tire bracket is joined to the front part of the spare tire placing panel; and the projecting part of the rear floor is provided between the joint part of the spare tire bracket and the spare tire placing panel and the joint part of the back panel and the spare tire placing panel.

6. The rear floor structure in a vehicle body rear part according to claim 3, wherein the back panel is formed into a curved shape projecting toward the vehicle rear, and the spare tire placing panel is formed so that the size in the vehicle width direction thereof increases toward the vehicle rear.

7. A rear floor structure in a vehicle body rear part, comprising:
    a spare tire placing panel having an inclined surface inclined downward toward the vehicle front provided above a rear floor, and a spare tire tiltingly mounted on the spare tire placing panel,
    wherein in an intermediate portion in the front and rear direction of the spare tire placing panel, a convex part directed upward in provided so as to extend along the vehicle width direction; between the rear floor and the spare tire placing panel in the vertical direction, a space for disposing a rigid member is formed; and on the vehicle front side of the axis center of the rigid member on the rear floor, a projecting part extending in the vehicle width direction is provided;
    wherein a back panel is provided in the rear part of the rear floor, and the rear part of the spare tire placing panel is joined to the back panel so that the spare tire is positioned at the installation height of a bumper member,
    wherein the back panel is formed into a curved shape projecting toward the vehicle rear, and the spare tire placing panel is formed so that the size in the vehicle width direction thereof increases toward the vehicle rear.

8. The rear floor structure in a vehicle body rear part according to claim 7, wherein the spare tire placing panel is provided with a bead, which extends in the vehicle longitudinal direction, excluding the convex part.

9. The rear floor structure in a vehicle body rear part according to claim 7, wherein the back panel under a joint part of the back panel and the spare tire placing panel is provided with a bead part extending in the vehicle width direction, and the rear floor and the back panel are joined to each other in the bead part.

10. The rear floor structure in a vehicle body rear part according to claim 7, wherein above the rear floor, a spare tire bracket having a spare tire fixture is provided; the rear part of the spare tire bracket is joined to the front part of the spare tire placing panel; and the projecting part of the rear floor is provided between the joint part of the spare tire bracket and the spare tire placing panel and the joint part of the back panel and the spare tire placing panel.

11. A rear floor structure in a vehicle body rear part, comprising:
    a spare tire placing panel having an inclined surface inclined downward toward the vehicle front provided above a rear floor, and a spare tire tiltingly mounted on the spare tire placing panel,
    wherein in an intermediate portion in the front and rear direction of the spare tire placing panel, a convex part directed upward is provided so as to extend along the vehicle width direction; between the rear floor and the spare tire placing panel in the vertical direction, a space for disposing a rigid member is formed; and on the vehicle front side of the axis center of the rigid member on the rear floor, a projecting part extending in the vehicle width direction is provided,
    wherein a back panel is formed into a curved shape projecting toward the vehicle rear, and the spare tire placing panel is formed so that the size in the vehicle width direction thereof increases toward the vehicle rear.

12. The rear floor structure in a vehicle body rear part according to claim 11, wherein the spare tire placing panel is provided with a bead, which extends in the vehicle longitudinal direction, excluding the convex part.

13. The rear floor structure in a vehicle body rear part according to claim 11, wherein the rigid member is a jack.

14. The rear floor structure in a vehicle body rear part according to claim 11, wherein a back panel under a joint part of the back panel and the spare tire placing panel is provided with a bead part extending in the vehicle width direction, and the rear floor and the back panel are joined to each other in the bead part.

* * * * *